United States Patent [19]

Michael

[11] Patent Number: 5,005,520

[45] Date of Patent: Apr. 9, 1991

[54] ANIMAL LITTER DEODORIZING ADDITIVE

[76] Inventor: Richard D. Michael, 7910 Milbury Rd., Baltimore, Md. 21207

[21] Appl. No.: 342,323

[22] Filed: Apr. 24, 1989

[51] Int. Cl.$^5$ .............................................. A01K 1/015
[52] U.S. Cl. ..................................... 119/172; 119/173; 119/171
[58] Field of Search ............................................ 119/1

[56] References Cited

U.S. PATENT DOCUMENTS

| | | | |
|---|---|---|---|
| 3,636,927 | 1/1972 | Baum | 119/1 |
| 3,675,625 | 7/1972 | Miller et al. | 119/1 |
| 3,735,734 | 5/1973 | Pierce et al. | 119/1 |
| 4,570,573 | 2/1986 | Lohman | 119/1 |
| 4,641,605 | 2/1987 | Gordon | 119/1 |
| 4,727,824 | 3/1988 | Ducharm et al. | 119/1 |
| 4,821,677 | 4/1989 | Harrison | 119/1 |
| 4,824,810 | 4/1989 | Lang et al. | 119/1 |

*Primary Examiner*—Paul J. Hirsch

[57] ABSTRACT

A litter material additive that by oxidation, effectively suppresses the majority of small animal odors originating from animal excreta, by using sodium perborate as the preferred oxidizing additive, and additionally using a desiccant for moisture control and a buffer for pH control.

6 Claims, No Drawings

ANIMAL LITTER DEODORIZING ADDITIVE

BACKGROUND OF THE INVENTION

As litter for use in animal bedding, various absorbent and absorbent mixture compositions, have been used in the past. Such materials quite often have a limited degree of odor controlling activity. This depends on the number and condition of the animals, and the extent of use of the litter. In the past the deodorizing effect is soon exhausted. For this reason, many products have been developed and some sold to help eliminate these animal excreta odors. These additives extend the useful life span of the litter filler or absorbent medium. Most of these products are primarily composed of inexpensive buffering agents such as sodium bicarbonate, calcium bicarbonate and similar double salts of metals. But, even with these additives, their ability to control and absorb the odors is still limited, and the effect is not able to be sustained for great lengths of time.

Other approaches have been to combine these odor buffers with fragrant esters to cover or mask this so called "cat box odor". Even this masking approach only extends the odor controlling effect a minor time amount (such as a day), and sometimes with the negative effect, such as the animal resisting using the litter because the fragrance while pleasant to humans is offensive to the animal. This offensiveness to the animal often results in animal indiscretions. Certain animals, specially some cats perceive the fragrances as offensive.

Examples of some of the above attempts at deodorizing additives are found embodied in U.S. patents, numbered;

a. U.S. Pat. No. 4,641,605 discloses the use of sodium or ammonium persulfate as the oxidizing deodorant.

b. U.S. Pat. No. 4,607,594 discloses an animal litter utilizing what are now common buffering agents such as carbonates and bi-carbonates.

c. U.S. Pat. No. 3,921,581 uses as the principal deodorant a fragrant masking aroma which is slowly released over a limited time.

d. U.S. Pat. No. 3,735,734 discloses the use of chlorophyll as the major deodorant agent.

e. U.S. Pat. No. 3,675,625 incorporates a fragrance to counteract the nature produced odors.

Close approach to the present inventive function and proposed composition and product was not observed in the above cited references. Accordingly, the patents cited above and their patents of reference should be considered as being of general interest and illustrative of the scope of the available art. None, appear to be close; in function, composition or product produced thereby, to the herein proposed inventive concept.

Many other similar products are sold that have apparently no patent protection. One example of this is a product called "Glade Litter Fresh", which is an example of a mixture of buffering agents (calcium carbonate) and masking fragrances. Most of these products or others like them, are incapable of producing long lasting odor control. Rarely do they significantly increase the useful life expectancy of the litter medium with which they are paired. Again the aromas they produce are perceived as unpleasant by the subject animal.

It is the object of the present invention to provide profound odor suppression without the addition of masking fragrances that might be disconcerting or disturbing to the subject animal. Another object of this invention is to provide not only a deodorant litter but one that is of the proper pH range to promote the health of the animal. Test of the animals that are in contact with the litter over a period of 6 months show no adverse effects. On the contrary the tests show that the additive disclosed herein is particularly bactericidal for anaerobic bacteria. The anaerobic bacteria are generally regarded as the more dangerous of the bacteria divisions. It is perceived that the embodiment of this invention produces a material additive that is functionally compatible with a wide variety animal litters such as; clay based litters, cellulosic litters, wood particles, particulate corn cob, shredded news print or news paper.

SUMMARY OF THE INVENTION

According to the present invention, it is believed that deodorization is achieved by oxidation of the waste material. This is a broadly accepted concept in treatment of animal waste products. It is routinely achieved with the administration of concentrated hydrogen peroxide, a liquid. To achieve the same effect in this application, a dry product is needed. It appears that if the product additive is placed in contact with moisture of animal wastes, the additive converts the peroxide or peroxygen compound and generates sufficient quantities of nascent oxygen, to oxidize the odoriferous compounds into non odoriferous compounds. The best choices of the available peroxygen compounds in terms of safety function and cost effectiveness are sodium perborate and sodium percarbonate. They possesses a low order of toxicity and are quite capable of oxidizing the offensive urinary animal odors commonly referred to as "cat box odor".

The addition of a desiccating agent, improves the operation of the deodorizing additive, but is not necessary for the proper improved operation of the subject invention, particularly when compared to the products taught in the prior art.

To adjust the pH of the admixture which is normally alkaline, when using chemicals such as sodium perborate and sodium percarbonate, it is desirable that an acidifying buffer be added. For this purpose mono sodium phosphate sodium bisulfate or similar buffers are satisfactory to adjust the pH of the mixture to a pH to the range of 6 to 9 with the preferred pH at 7. This combination of materials is then used as an adjunct to the litter normally used by the pet owner. In most cases this would be a common clay litter, but this invention is compatible with any other filler medium currently employed for this purpose. These can include cellulosic litters such as corn cob granules and sawdust products that are considered flushable thru a sanitary sewer system. The chemicals involved in this invention are all harmless to sanitary sewer systems, when considered in the concentrations recommended in this invention.

DESCRIPTION OF THE PREFERRED EMBODIMENT

The illustrated preferred embodiment is not intended to limit the invention in the precise form shown. What is shown is chosen to best describe and explain the basic or preferred principals of the invention and its application and practical use.

Using dry compounding equipment, usually a revolving drum type mixer, the sodium perborate-oxidizer, sodium bisulfate-buffer and the silica gel, or other free flow agent, are all mixed and blended to a 7 pH (or neutral pH, which has been determined best for the health of animals) preferably or to a 6-9 range pH.

The by volume proportions are for Formula I;
5 parts silica gel,
16½ parts sodium perborate, and
1 part sodium bisulfate,
for Formula II
72% sodium percarbonate
24% monosodium phosphate
4% silica gel
for Formula III in formulas I and II proportionate amounts of phosphorus pentoxide, moisture absorbent starches, or wood flour may be substituted for the silica gel.

The above are combined until a uniform homogeneous mixture is obtained, which will be usually at a pH of about 8. At this point a small sample of the homogeneous mixture (for example 5 cc) is dissolved in distiled water, and it is tested in a known manner for the proper pH. Accordingly if the determined pH is too high, i.e. more than 8.5, a small amount of the acidifying sodium bisulfate should be added for pH adjustment. If too low the pH can be adjusted in the other direction by the addition of more peroxygen compounds accordingly. At a pH of 7 plus or minus 1.0 pH units the product is ready for packaging and shipment. When packaged this product will resemble laundry detergent and will be packaged accordingly. To use the pet owner will remove a measured 7 Oz. (by volume) by a measuring cup. This amount of material in thoroughly mixed with a typical quantity of litter (approximately 5 to 10 pounds) in the litter receptacle or device. The litters considered here are, the expanded clay, clay, dried alfalfa, dried green leafy plants, cotton seed hulls nut shells wood flour pellets, fullers earth and talc and sand type litters. Most of the commonly employed litter pans are square or rectangular trays approximately four inches in height and of sufficient area to provide comfortable use by the subject animal. Often a hood with a single opening at the front is attached to more completely contain the animal and the pan's contents. The quantity of 7 oz. of the mixed and buffered additive should be enough to treat most sizes of small animal pans (those that usually contain up to 10 lbs. of clay type litter). Other litters, such as cellulosic, corn cob and paper litters according to their absorbancy, which is usually less than clay type litters will require more than the previously prescribed amount of additive.

After initial treatment, minimal maintenance is required. Primarily the removal of stools is the only maintenance required between refillings. The odor suppression will persist for varying lengths of time. For example, the deodorizing effect last at least a week using the above noted formulas. Of course, this depends on the number and condition of the animals using the device.

In field trials with animals in a typical home environment this product, routinely has been capable of increasing by two fold the effective life span of most litter types, over the untreated litters of the same type. Tests show no other product has proved as effective at eliminating the intractable feline urinary odor commonly referred to as cat odor. The product also improves the deodorizing effect of the comparatively less noticeable fecal odor.

What is claimed:

1. A method for deodorizing animal litter employing an oxidizing deodorizer substance which is a metallic double salt selected from a group consisting essentially of sodium percarbonate, sodium perborate, potassium percarbonate, and potassium perborate.

2. The method according to claim 1 wherein said oxidizing deodorizer substance, is additionally mixed with silica gel or other inexpensive desiccant.

3. The method according to claim 1, wherein said oxidizing deodorizer substance and desiccant combination is adjusted to a resulting mixture pH range of 6.9 to 7.1.

4. A method for deodorizing animal litter employing a peroxygen compound which is a metallic double salt selected from a group consisting essentially of sodium percarbonate, sodium perborate, potassium percarbonate, and potassium perborate, calcium perborate, and calcium percarbonate.

5. The method according to claim 4 wherein said peroxygen compound is additionally mixed with a free flow agent from a group consisting essentially of silica gel, moisture absorbant starches, phosphorous pentoxide, and wood flour.

6. The method according to claim 4 wherein said litter to which the additive is added are from a group consisting essentially of expanded clay, fullers earth, nut shells, cotton seed hulls, wood flour pellets, dried alfalfa, dried green leafy plants, paper, and cellulosic fibers.

* * * * *